US006152591A

United States Patent [19]

[11] Patent Number: 6,152,591

[45] **Date of Patent: *Nov. 28, 2000**

McCall et al.

[54] INTERACTIVE GRAPHICS DISPLAY SYSTEM FOR A FUEL DISPENSER

[75] Inventors: Don C. McCall, Round Rock; David A. Biedermann, Austin, both of Tex.

[73] Assignee: Dresser Industries, Inc., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,896

[22] Filed: Feb. 27, 1997

Related U.S. Application Data

[60] Provisional application No. 60/012,784, Mar. 4, 1996.

[51] Int. Cl.[7] .......... G06F 19/00

[52] U.S. Cl. .......... 364/479.01; 364/479.02; 235/380

[58] Field of Search .......... 364/479.01, 479.02, 364/479.03, 479.06, 479.07, 479.04, 479.09, 479.1, 479.11, 479.14; 235/378, 380, 381, 382, 382.5, 385

[56] References Cited

U.S. PATENT DOCUMENTS

| | | | |
|---|---|---|---|
| 3,931,497 | 1/1976 | Gentile et al. | 235/381 |
| 4,107,777 | 8/1978 | Pearson et al. | 705/413 |
| 4,199,100 | 4/1980 | Wostl et al. | 235/381 |
| 4,290,538 | 9/1981 | White et al. | 222/25 |
| 4,395,626 | 7/1983 | Barker et al. | 235/381 |
| 4,395,627 | 7/1983 | Barker et al. | 235/381 |
| 4,461,401 | 7/1984 | Sasnett | 222/27 |
| 4,967,366 | 10/1990 | Kaehler | 364/497.07 |
| 5,027,282 | 6/1991 | Hollidge | 364/479.02 |
| 5,482,139 | 1/1996 | Rivalto | 186/36 |
| 5,493,315 | 2/1996 | Atchley | 345/616 |
| 5,659,482 | 8/1997 | Warn et al. | 364/479.06 |
| 5,663,887 | 9/1997 | Warn et al. | 364/479.02 |
| 5,694,326 | 12/1997 | Warn et al. | 364/479.01 |
| 5,719,781 | 2/1998 | Leatherman et al. . | |

*Primary Examiner*—Paul P. Gordon
*Attorney, Agent, or Firm*—Haynes and Boone, L.L.P.

[57] ABSTRACT

The present invention is a system for providing a fuel dispenser with a graphics interface. The system easily retrofits onto an existing, conventional fuel dispenser. The system likewise allows a customer to interact with the commercials as well as the instructional interface. The system includes a video display terminal, a touch screen, a multimedia controller, and a pump interface. A conventional fuel dispenser may be readily retrofitted with the system because the multimedia controller and pump interface communicate with a customer activated terminal already on the conventional fuel dispenser. The system also operates in a manner to determine if the customer has used the fuel dispenser before, and if not, displays additional instructions and videos to explain operation of the fuel dispenser. The system also allows the customer to select between different categories of commercials in order to purchase amenities. Furthermore, the system provides a manner in which to reward the customer for such things as frequent purchases and to include all of the purchases on a single receipt.

12 Claims, 5 Drawing Sheets

INTERACTIVE GRAPHICS DISPLAY SYSTEM FOR A FUEL DISPENSER

CROSS REFERENCE

This application claims the benefit of U.S. Provisional Application Ser. No. 60/012,784, filed Mar. 4, 1996.

BACKGROUND OF THE INVENTION

The invention relates generally to a fuel dispenser customer interface and, more particularly, to an interactive display system for a fuel dispenser that presents graphical data such as instructions and commercials to a customer and receives inputs from the customer.

Dispensers for gasoline and other fuels are undergoing many advances in technology. For example, modern dispensers are electrically connected to computing devices to enable a customer to pay for the fuel at the dispenser itself. Furthermore, modern dispensers have electronic displays for showing sales data, including price-per-gallon, total number of gallons dispensed, and total amount of money due as well as brief advertisements for services such as car washes.

Most modern fuel dispensers utilize small, inexpensive liquid crystal displays ("LCDs") that readily display numerals and a limited amount of text. These small LCDs are ideally suited to display sales data, as well as to advertise some services. Recently, electronic displays for new fuel dispensers have been designed with larger graphics displays that are more customer friendly and support different types of graphic data. As a result, many such graphics displays are utilized to show the sales data as well as additional graphics data such as detailed instructions and commercials.

Although the graphics displays provide easy and friendly support to the customer, most current fuel dispensers do not have the capability for graphics data. Furthermore, incorporating a new graphics display into an older, conventional fuel dispenser system is very difficult. The difficulty lies in interfacing the conventional dispenser system with a multimedia controller for driving the graphics display. The conventional fuel dispenser system typically includes an external point-of-sale ("POS") controller and a fuel dispenser with various electronics including a credit card reader/printer, an electronics display and a pump controller. Communications between the POS controller and the dispenser electronics are achieved using a customer activated terminal located inside the dispenser.

Currently, there are two solutions for incorporating a new multimedia controller into a conventional fuel dispenser system. The first solution replaces the original POS controller with the new multimedia controller. The multimedia controller not only takes on the duties of the original POS controller, but controls the graphics display as well. The second solution provides a new multimedia controller that works in conjunction with the POS controller. The multimedia controller in this solution attempts to intercept and insert data communications between the POS controller and the customer activated terminal. The multimedia controller uses the intercepted data for the graphics display and then inserts additional data for the POS controller.

The above mentioned prior solutions have many drawbacks. In the first solution, replacing the original POS controller with a multimedia controller is difficult because there are many different models of POS controller, as well as many different programs running on the POS controllers. In addition, the POS controller communicates with many different credit card/debit card networks. Therefore, the replacement multimedia controller has to be knowledgeable and adaptable to all the different potential POS controllers. Another drawback is that the multimedia controller now has an increased work load because the multimedia controller must also perform all the tasks of the old POS controller. In the second solution, inserting and intercepting the data to and from the original POS controller requires the multimedia controller to sift through and correctly interpret a great deal of data that is communicated between the POS controller and the customer activated terminal. Most of the data is directly related to the conventional operation of the fuel dispenser, and therefore not needed by the multimedia controller. Another drawback for both of the solutions is that there are some activities that go on in the dispenser that some models of POS controllers do not control. For example, when a credit card is inserted into the credit card reader/printer, the customer activated terminal sends back the message to remove the credit card without notifying the POS controller. Finally, the above two prior solutions make retrofitting an existing fuel dispenser into one with multimedia a very tedious, expensive, and time consuming job.

Another problem associated with the graphics display in fuel dispensers is the lack of interactivity between the customer and the commercials or instructions. As for the commercials, conventional graphics displays show a series of text, picture or full motion advertisements, hereinafter commercials, that are running on a continuous loop. As a result, when the customer arrives at the fuel dispenser, he often starts in the middle of a commercial. In addition, the subject matter of the commercials may not be of any interest to the customer, thereby eliminating the benefit of the graphics display for that customer. As for the instructions, it is difficult to balance the amount of instructions needed for a first time customer who has never used the fuel dispenser and a regular customer who wants to get in and out quickly without wasting time on instructions that he does not need.

Furthermore, the interaction between the customer and conventional fuel dispensers is somewhat limited. For example, modern electronic displays may advertise the car wash service, notifying the customer that the car wash can be purchased by pushing a keypad on the dispenser. But this level of interaction only has limited effectiveness. For example, the responses from the customer are typically limited to "yes" or "no" type responses due to the limited space for the keypad. Also, the use of the keypad is confusing, and often generates incorrect responses. Furthermore, if the customer is a repeat customer, he must repeatedly be shown the same commercials and instructions.

Therefore, what is needed is an interactive graphics interface that may be easily incorporated into an existing fuel dispenser.

Furthermore, what is needed an interactive graphics interface for allowing the customer to have some level of control over the commercials and level of instruction.

Furthermore, what is needed is an interactive graphics interface for providing the commercials responsive to the customer interactions and other variables.

SUMMARY OF THE INVENTION

The foregoing problems are solved and a technical advance is achieved by an interactive graphics display system for a fuel dispenser that provides a video interface with the customer. The system easily retrofits onto an existing, conventional fuel dispenser by interacting with a customer activated terminal located in the conventional dispenser. The system likewise allows the customer to interact with commercials as well as instruction data.

To this end, the interactive graphics display system includes a video display terminal, a touch screen, a multimedia controller, and a database. The system operates in a manner to determine if the customer has used the fuel dispenser before, and if not, displays additional instructions to explain operation of the fuel dispenser. The system also allows the customer to select between different categories of commercials. Upon selecting a category of commercial, the system shows a commercial responsive to the category and prompts the customer to purchase, displaying the purchases onto a video receipt. Furthermore, the system provides a means in which to reward the customer for such things as frequent purchases. Upon completion of the fuel and/or amenity purchase, a single, categorized receipt is printed.

A technical advantage achieved with the present invention is that it provides a video interface that may be easily retrofitted into an existing fuel dispenser.

Another technical advantage achieved with the present invention is that it allows the customer to more easily interact with the commercials.

Another technical advantage achieved with the present invention is that it provides commercials responsive to the customer interactions as well as other factors.

Another technical advantage achieved with the present invention is that it provides an interface that is customized to a particular customer.

DETAILED DESCRIPTION OF THE PREFERRED EMBODIMENT

Figure 1:
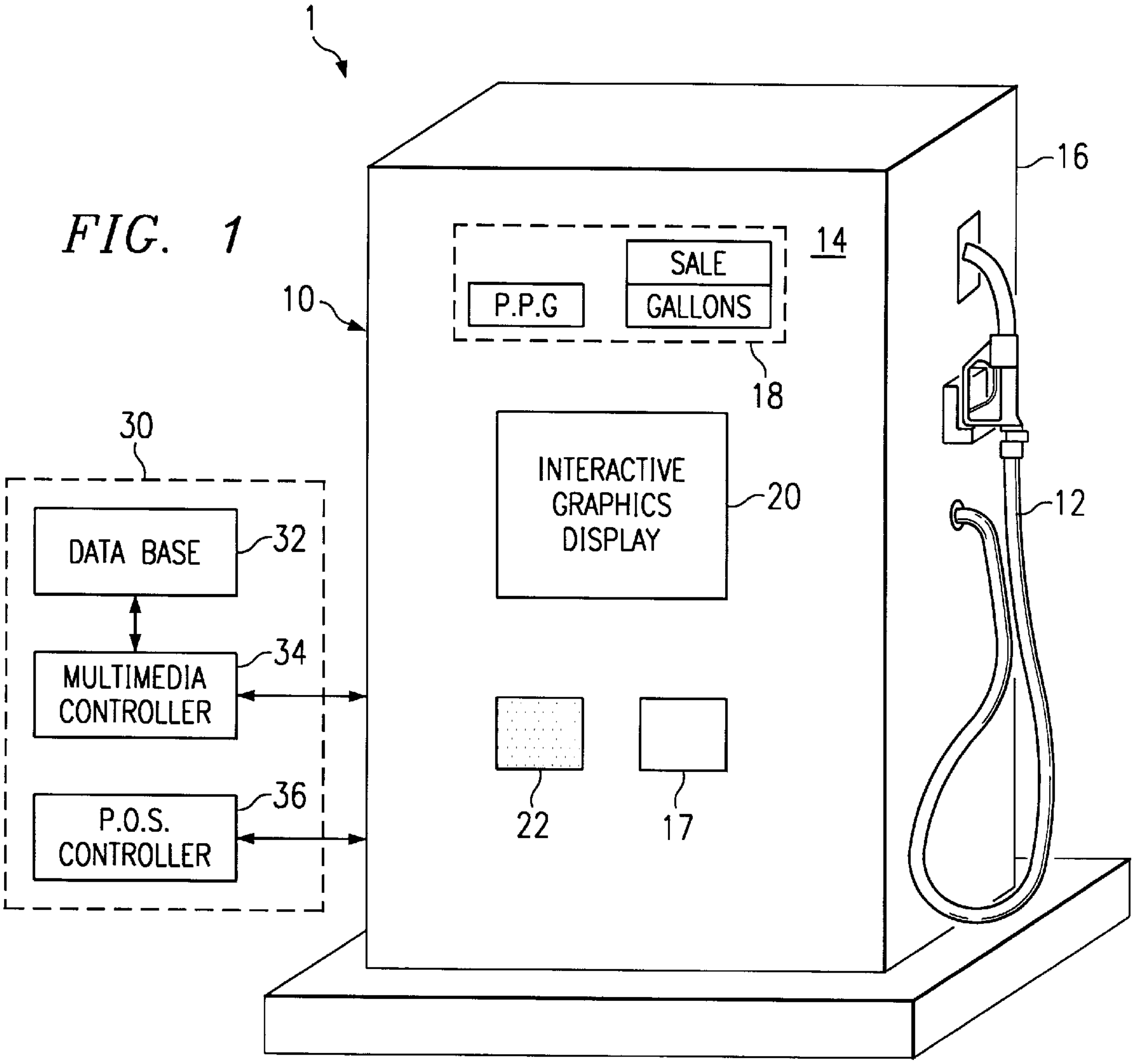
FIG. 1 is a block diagram of a fuel dispenser system embodying features of the present invention.

In FIG. 1, the reference numeral 1 refers to a fuel dispenser system embodying features of the present invention. The fuel dispenser system 1 includes a fuel dispenser 10, which contains many elements of a conventional fuel dispenser, such as a fuel nozzle 12 connected to a fuel supply (not shown). The fuel nozzle 12 may also be representative of multiple fuel nozzles, all connected to the fuel dispenser 10. The dispenser 10 has a front side 14 and a back side 16. In the following description of the preferred embodiment, only the front side 14 will be discussed for ease of description. However, the features of the present invention may also be applied on the back side 16, thereby allowing the dispenser to be operated by two customers at the same time.

The front side 14 houses a conventional credit card device 17, and two display systems, i.e., a price board 18 and an interactive graphics display 20. The price board 18 is a small, conventional, liquid crystal display ("LCD"). The price board 18 is located near the graphics board 20, and displays only monochrome sales data including price-per-gallon, total number of gallons dispensed and total amount of money due. The interactive graphics display 20 comprises a large, conventional, active matrix flat panel display for showing text, picture and/or full motion video advertisements, hereinafter commercials, and text, picture and/or full motion video instructions, hereinafter instructions. The graphics display 20 also comprises a touch-screen overlaying the display as the user interface for making purchase selections, as described in detail below. Also associated with the interactive graphics display 20 is an audio speaker 22.

In addition to the dispenser 10, the fuel dispenser system 1 includes a computing center 30. In the preferred embodiment, the computing center 30 is remotely located inside a store (not shown) where it may be readily accessed. The computing center 30 comprises a database 32, a multimedia controller 34 and a point-of-sale ("POS") controller 36. Although not shown, it is understood that the database 32 incorporates many features including a disk drive for storing commercials and instructions to be sent to the interactive graphics display 20 as well as additional memory to record data received from the interactive graphics display. The multimedia controller 34 is a conventional multimedia computer capable of communicating with the database 32 and the dispenser 10. The POS controller 36 is a conventional dispenser controller for controlling the conventional aspects of the dispenser 10, including the fuel nozzle 12 and the credit card device 17. Hardware aspects of the computing center 30 and the dispenser 10 are discussed in greater detail with respect to FIG. 2, while software aspects are discussed in greater detail with respect to FIGS. 3–6.

Figure 2:
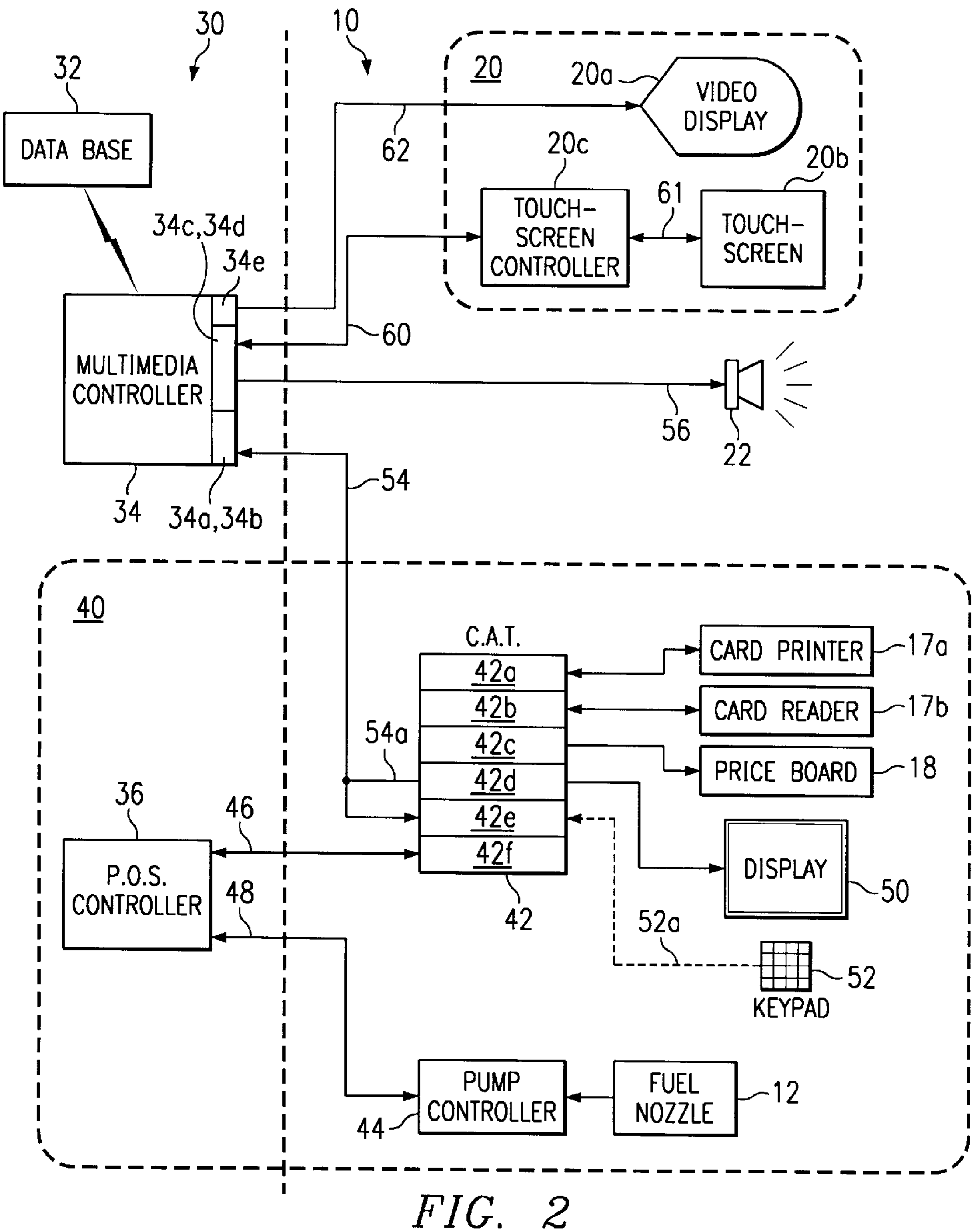
FIG. 2 is a hardware diagram of the fuel dispenser and computer system of the dispenser of FIG. 1.

FIG. 2 illustrates details of the computing center 30 and the dispenser 10 that comprise the system 1. It is understood that the system 1 may be installed at a fuel station as an integrated system of new components or as an upgrade to existing equipment. For example, it is recognized that many stations are already equipped with a conventional dispenser system 40 that does not have the interactive graphics capabilities of the present invention. Instead of replacing the dispenser system 40 in its entirety or significant portions thereof to achieve the system 1, components of the computing center 30 and the dispenser 10 are easily integrated with the conventional dispenser system 40 without having to, for example, replace or re-program the POS controller 36. Thus the system 1 may be efficiently achieved by retrofitting the conventional dispenser system 40 even though the system 40 might be any one of a variety of models utilizing any one of a variety of communications protocols for data transfers between the POS controller 36 and pump controller boards of the system 40.

The conventional dispenser system 40 includes the POS controller 36, the credit card device 17 which includes a card printer **17*a* and a card reader 17*b*, the price board 18, the fuel nozzle 12, a customer activated terminal ("CAT") board 42 and a pump controller 44. In the preferred embodiment, the POS controller 36 is a Wayne-Plus Model 3 electronic controller, but may be any one of a variety of different model controllers available from different manufacturers. The POS controller 36 communicates with the CAT board 42 through an RS-485 cable 46 and with the pump controller 44 through a twisted-pair cable 48**.

The conventional dispenser 40 also includes a small digital display 50 and a keypad 52. Both the digital display 50 and the keypad 52 are only utilized by the unimproved conventional dispenser system 40 and remain unused in the system 1. Therefore, they are represented as dotted boxes, representing that there presence is not necessary. In a new dispenser system 40 utilizing the features of the present invention, the digital display 50 and the keypad 52 would most likely be left out. In a retrofitted dispenser 40 utilizing the features of the present invention, the digital display 50 and the keypad 52 can either be removed, or simply hidden by the front side 14 (FIG. 1) of the dispenser 10.

The CAT board 42 comprises a plurality of sub-components including a card printer interface 42*a*, a card reader interface 42*b*, a price board interface 42*c*, a display driver 42*d*, a first RS-485 interface board 42*e* previously used for the keypad 52, and a second RS-485 interface board 42*f*. In this manner, the CAT board 42 can simultaneously communicate with the card reader 17*b*, card printer 17*a*, the price board 18, and the controllers 34, 36 connected to RS-485 cables 46, 54, respectively. Furthermore, display information previously sent to the digital display 50 can also be routed to the controller 34 through the RS-485 cable 54. The display driver 42*d* conventionally interfaces with the interface board 42*e* directly inside the CAT board 42, but is referenced graphically in FIG. 1 as a bus 54*a*.

It is a feature of the present invention that, to retrofit a conventional dispenser system 40 to include the improvements of the present invention, described in greater detail below, only one electrical modification to the conventional dispenser system is required. The one electrical modification is to remove an old RS-485 cable 52*a* that previously connected the keypad 52 and the interface board 42*e* and replace it with the RS-485 cable 54, which connects the controller 34 and the interface board.

In addition to the conventional dispenser system 40, the system 1 includes the multimedia controller 34, the database 32, the speaker 22, and the interactive graphics display 20 which includes a graphics display 20*a*, a touch-screen 20*b*, and a touch screen controller 20*c*. As previously mentioned, the display 20*a* is an active matrix display capable of displaying video or graphics segments (hereinafter, "graphics"). The touch-screen 20*b* overlays the display 20*a* and, in cooperation with the touch-screen controller 20*c*, operates as a user interface whereby a customer may make selections from graphics prompts displayed on the display 20*a* by touching the corresponding location on the touch-screen 20*b*.

Although not shown, the multimedia controller 34 includes conventional components including a hard drive for storing the graphics data, a central processing unit for analyzing the customer interaction, and a network interface for communicating with the database 32. In the present embodiment, the network interface is an Ethernet card (not shown) for local communication with the database 32. However, it is understood that other network interfaces may be utilized, such as a radio frequency, telephone, or satellite interfaces, for effecting communications between one or more databases 32 situated in one or more remote locations.

The multimedia controller 34 further includes a plurality of interface ports, including two serial ports 34*a*, 34*b*, two I/O ports 34*c*, 34*d*, and a video port 34*e*. The first serial port 34*a* interfaces with the RS-485 cable 54, thereby allowing the multimedia controller 34 to communicate with the CAT board 42. The second serial port 34*b* provides an extra interface for the multimedia controller 34. The first I/O port 34*c* includes a conventional amplifier (not shown) for driving the speaker 22 through a speaker line 56. The second I/O port 34*d* interfaces with the touch-screen 20*b* through an RS-232 cable 60, the touch-screen controller 20*c*, and a bus 61. The video port 34*e* drives the graphics display 20*a* through a coaxial cable 62.

In operation, the multimedia controller 34 communicates with the conventional dispenser system 40 through the interface board 42*e* of the CAT board 42 as though the multimedia controller was the keypad 52. In this way, the multimedia controller 40 operates without requiring a modification to the POS controller 36. For example, when a customer inserts a credit card into the card reader 17*b*, a message is sent to the CAT board 42, which returns a message "REMOVE CARD" to the card display (not shown). Because the multimedia controller 34 is monitoring the CAT board 42, and not the POS controller 36, the multimedia controller receives the "REMOVE CARD" message and handles it accordingly.

The multimedia controller 34 displays a plurality of commercials, instructions and customer interface routines through the interactive graphics display 20 and the speaker 22. Furthermore, the multimedia controller 34 communicates with the database 32 in a manner that not only provides a convenient and easy interface for the customer, but also provides valuable information for advertisers and other parties, as discussed in greater detail below.

Figure 3:
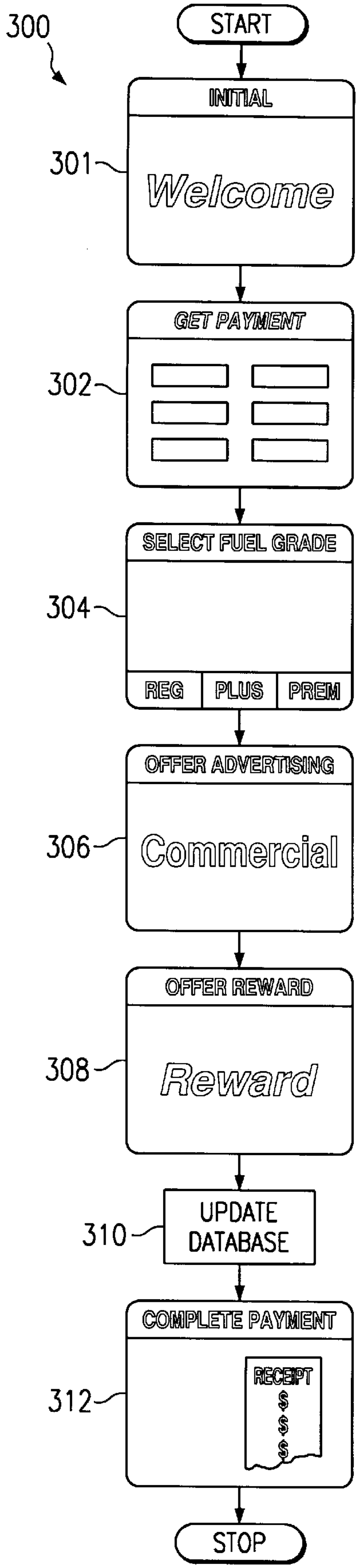
FIG. 3 is an operational flow chart of a main program for the dispenser of FIG. 1.

Referring also to FIG. 3, the multimedia controller 34 runs a main program 300 to control the interactive graphics display 20, the speaker 22, the fuel nozzle 12, and the credit card device 17. It is understood that the program 300 is written in a conventional language, and is adapted to an operating system (not shown) running on the multimedia controller 34. Subroutines and logic decisions are described that are capable of being implemented using known programming techniques, as would be evident to one of ordinary skill in the art.

Execution of the main program 300 begins with step 301, which runs a WELCOME subroutine. The WELCOME subroutine may be as simple as the display of a logo, or may be a commercial for the store. Execution then proceeds to step 302, which calls a GET PAYMENT subroutine. The GET PAYMENT subroutine graphically interacts with the customer to determine if payment is going to be made at the dispenser 10, or in the alternative, inside the store. Furthermore, the GET PAYMENT subroutine determines if the customer is an "expert" or "novice" customer, and customizes further instructions to the customer accordingly. The GET PAYMENT subroutine is discussed in greater detail with reference to FIG. 4.

Upon completion of the GET PAYMENT subroutine in step 302, execution of the main program 300 proceeds to step 304, which calls a SELECT FUEL GRADE subroutine. The SELECT FUEL GRADE subroutine allows the customer to select from one or more options of fuel grade by interfacing with the interactive graphics display 20. The selection is made by viewing graphics on the display 20*a* and touching the touch-screen 20*b* on the desired graphics choice. Also, the instructions and graphics to make the selection may differ in detail depending upon a novice or expert status of the customer, as previously determined in step 302 and described in greater detail below. For example, the novice customer might receive a detailed combination of audio, text and graphics prompts to make the selection while in contrast the expert might alternatively be presented with an abbreviated prompt of the choice of grades using basic graphics with no audio and/or text instructions.

Once the payment and the fuel grade options are determined, execution proceeds to step 306 which calls an OFFER ADVERTISING subroutine. The OFFER ADVERTISING subroutine of step 306 causes the interactive graphics display 20 to interact with the customer, using the speaker 22, the display 20a and the touch-screen 20b, to facilitate the purchase of various amenities and to show commercials. The payment method for any such purchases is already captured in connection with the fuel purchase, as previously described with respect to step 302.

All types of commercials, including amenity offerings or other advertisements, are contemplated within the scope of the present invention. The amenity offerings might include, for example, convenience store items (e.g., drinks, cigarettes, lottery tickets); food items to be hand-delivered to the customer at the dispenser (or inside the store); music tapes or CDs; car wash or car maintenance services; local merchant offerings; and national mail order catalog offerings (e.g., Land's End, L.L. Bean, Service Merchandise) to be delivered to the customer's payment card mailing address. The other advertisements differ from the amenity offerings in that the advertisements may or may not result in an immediate offering of an amenity for purchase. For example, fuel companies may desire to provide advertisements for purposes of providing customer entertainment or for generating customer loyalty. It is also contemplated that some of the advertisements may be directed to the enticement of later purchases once the customer has left the store. The OFFER ADVERTISING subroutine is discussed in greater detail with reference to FIG. 5.

Upon completion of the OFFER ADVERTISING subroutine 306, execution proceeds to step 308 wherein an OFFER REWARD subroutine is executed that analyzes the database 32 to determine if the customer should be rewarded, and if so, what the reward should be. The OFFER REWARD subroutine is discussed in greater detail with reference to FIG. 6.

Upon completion of the OFFER REWARD subroutine of step 308, execution proceeds to step 310 where the database 32 is updated with the transaction information for the customer. As mentioned previously, such information is used to determine future offerings, commercials and rewards to the customer. At step 312 a COMPLETE PAYMENT subroutine is executed. The COMPLETE PAYMENT subroutine is discussed in greater detail with reference to FIG. 7.

Upon completion of the transaction, the main program 300 stops and the system is now ready for the next customer.

Figure 4:
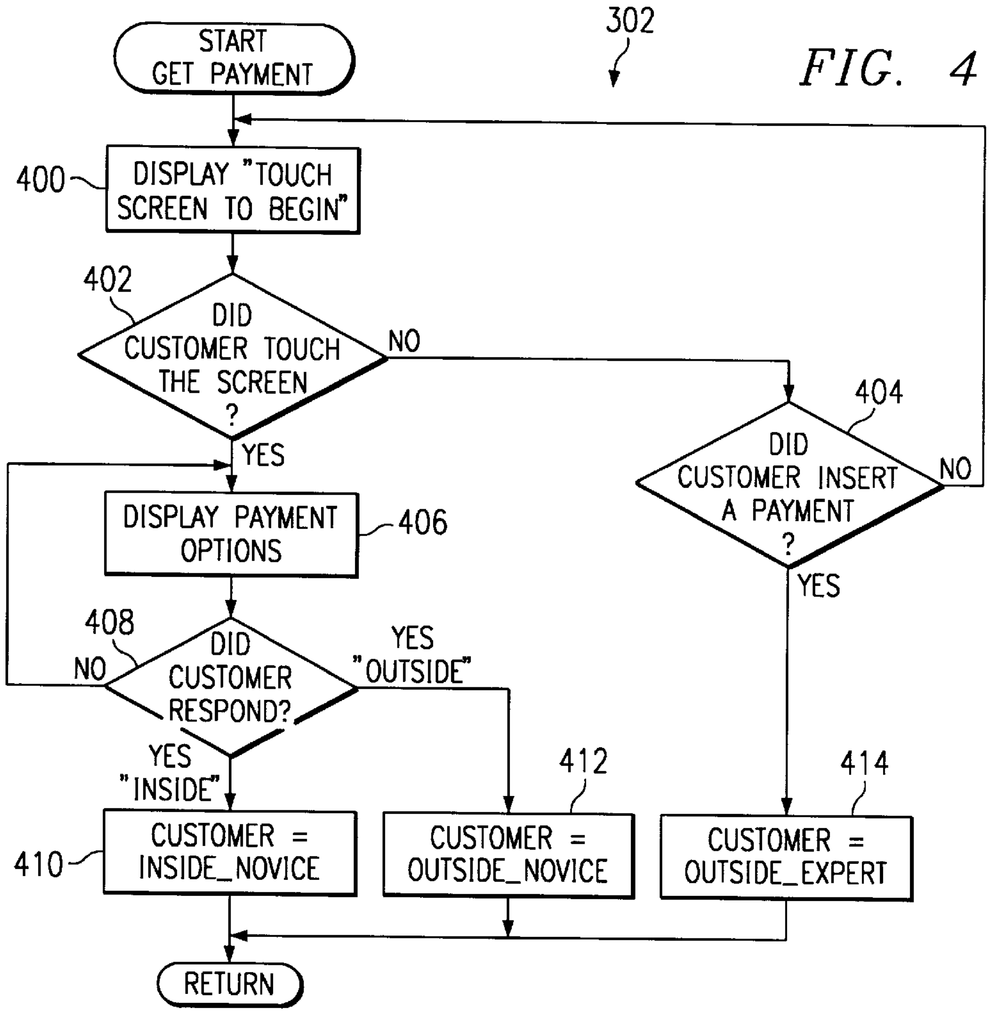
FIG. 4 is an operational flow chart of a GET PAYMENT subroutine of the main program of FIG. 3.

Referring to FIGS. 2 and 4, execution of the GET PAYMENT subroutine begins at step 400, wherein the multimedia controller 34 sends a message "TOUCH SCREEN TO BEGIN" to the graphics display 20a. In the context of the system 1, it is understood that any similar prompt or graphic, such as "TOUCH HERE FOR HELP", or some form of message giving the customer an opportunity for further instructions, is displayed. For example, the prompt may alternatively present to the customer a choice of abbreviated or detailed instruction options selectable by touching the appropriate location of the touch-screen 20b. Execution then proceeds to step 402, where a determination is made if the customer touched the touch-screen 20b. The multimedia controller 34 makes this determination by polling the touch-screen controller 20c for an input from the touch-screen 20b. If the customer has not touched the touch-screen 20b, execution proceeds to step 404, where a determination is made if the customer inserted a payment. The multimedia controller 34 makes this determination by polling the CAT board 42 for information from the card reader 17b. If the customer has not inserted a payment, execution of the GET PAYMENT subroutine proceeds back to step 400, thereby creating a polling loop until an input is received from the customer. In the context of the system 1, it is understood that a payment may be made by inserting a credit or debit card into the card reader 17b, or alternatively by inserting cash into a cash acceptance device (not shown).

In step 402, if the customer has touched the touch-screen 20b or otherwise has indicated a desire for detailed instruction, then the customer is considered to be a "novice" customer. A novice customer is a customer who is unfamiliar with the fuel dispenser 10 or who otherwise prefers detailed instruction prompts from the display 20b. Execution then proceeds to step 406, which calls a DISPLAY PAYMENT OPTIONS subroutine. The DISPLAY PAYMENT OPTIONS subroutine comprises a series of graphics and instructions to describe how to use the dispenser 10, including the various payment options. These are presented in large, easy to understand static graphics or moving graphics. For example, the instructions might display a picture of a credit card, a picture of cash, and a picture conveying the idea of payment inside, along with moving/blinking arrows or fingers pointing to the choices and synchronized audio instructing the customer to touch the desired selection. The graphics might also include a combination of text and graphics to draw attention to the selections or to otherwise aid in the selection process. The display 20a enables the instructions to be in full motion video with color graphics, as contrasted with rudimentary text displays that are more difficult to understand and that are not touch-screen activated.

The DISPLAY PAYMENT OPTIONS subroutine of step 408 initially shows only a first set of graphics and instructions. Execution then proceeds to step 408, where a determination is made if the customer responded. If the customer did not respond, execution proceeds back to step 406, where additional graphics and instructions are shown. The additional graphics and instructions may, for example, be presented in an alternative language or be presented in greater detail, making them easier to understand. Alternatively, the additional instructions may be a repeat of the earlier instructions.

If in step 408 a determination is made that the customer did respond, execution proceeds accordingly to either step 410 or step 412 for the customer who chooses to pay inside the store or outside at the dispenser 10, respectively. If the customer chooses to pay inside, a CUSTOMER flag is set to INSIDE_NOVICE and the computing center 30, and thus the clerk inside the store, is notified. If the customer chooses to pay outside, the CUSTOMER flag is set to OUTSIDE_NOVICE.

If in step 404 a determination is made that the customer inserted a payment without first requesting additional instructional help, or otherwise made a selection for only the most abbreviated instructions, then execution proceeds directly to step 414 and a CUSTOMER flag is set to OUTSIDE_EXPERT. An "expert" customer is a customer who is familiar with the fuel dispenser or who otherwise does not want detailed operating instructions on how to use the system 1. Upon completion of steps 410, 412, or 414, execution returns to the main program 300. While not shown, it is understood that a similar CUSTOMER flag of INSIDE_EXPERT may also be generated for an expert user who selects payment inside the store without also requesting detailed instructional information.

The CUSTOMER flag set by the computing system 30 is utilized to determine subsequent operation of the system 1 with respect to the handling of that customer using the interactive graphics display 20.

For example, CUSTOMER flag settings differentiating between novice and expert customers may be used to determine the amount of additional instructional information is to be given to the customer as the transaction proceeds, as discussed below with respect to both fuel purchases and amenity purchases. Particularly, expert customers would be given relatively abbreviated instructions while novice customers would be given relatively detailed instructions.

Furthermore, with respect to the offering of commercials, as discussed below, the CUSTOMER flag settings differentiating between novice and expert customers might be used to determine the selection of commercial choices to be presented to the customer. As discussed below, the system 1 is utilized to present commercials to the customer and to offer to the customer the ability to purchase a wide variety of amenities, e.g., things within the store, various services, and products available by mail order and the like. Thus it might be recognized that expert customers differ demographically from novice customers and therefore the commercials offered to expert customers should therefore include products appealing to that group, e.g., "generation X'ers" or technical people. Likewise, it might be recognized that the commercials to be offered to novice customers should include products appealing to that group, e.g., retired people or less technically inclined people.

The CUSTOMER flag differentiating between customers intending to pay outside at the dispenser 10 are useful in determining where a customer receipt is to be printed. For example, a CUSTOMER flag indicating an inside payment will dictate that the customer receipt is to be printed inside the store and not at the card printer 17*a*. Likewise, a CUSTOMER flag indicating an outside payment will dictate that a customer receipt is to be printed at the dispenser 10 using the card printer 17*a*.

The CUSTOMER flag settings differentiating between customers intending to pay outside at the pump are also useful in determining the categories of advertisements or amenity offerings to be made to the customer while the customer is dispensing fuel. For example, if the customer is going to pay inside, the advertisements and amenity offerings might prompt the customer to purchase items that are normally found inside the store, e.g., cigarettes, lottery tickets, candy, or other impulse items. Alternatively, if the customer is going to pay outside, the selection of advertisements and amenity offerings to choose from might be geared toward items more likely to be available outside the store or available through mail order vendors, e.g., a car wash; a delivery of food items to the car; or a selection of national catalog offerings that can be mailed to the home.

Thus the CUSTOMER flag enables the system 1 to offer the customer different categories of advertisements and amenities depending upon (1) the expert or novice status of the user; and (2) the location of payment either at the pump or inside the store.

Figure 5:
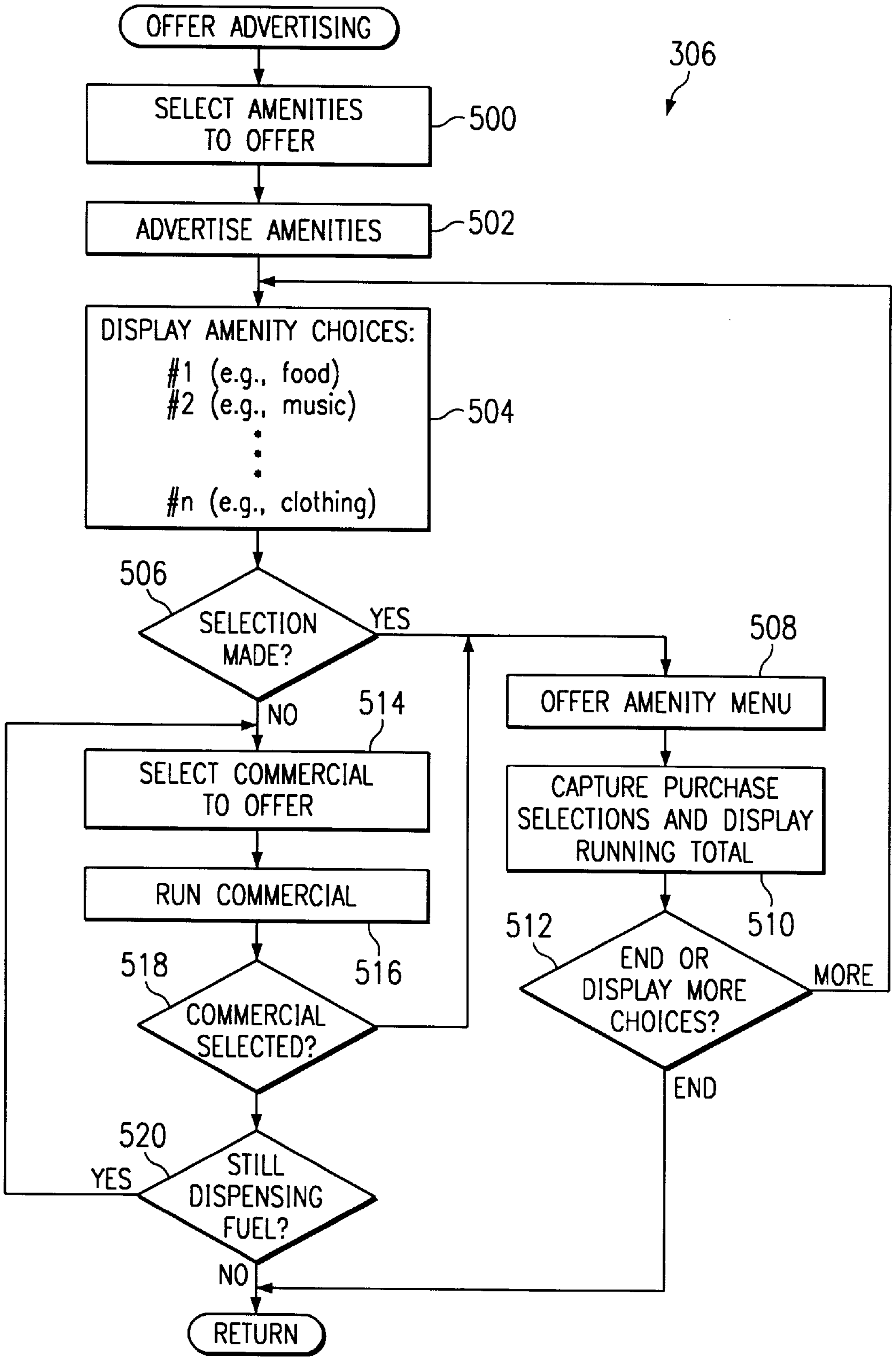
FIG. 5 is an operational flow chart of a OFFER ADVERTISING subroutine of the main program of FIG. 3.

Referring to FIGS. 2 and 5, the OFFER ADVERTISING subroutine of step 306 begins in step 500, wherein a selection of amenity choices to be offered to the customer is made, based upon various sources of data including CUSTOMER flag information as to the novice or expert status of the customer or the inside versus outside payment method selected by the customer. Additionally, the source of data include historical information about the customer stored in the database 32. Such information may include information on past purchase history at the station or past purchase history with other vendors. The information may have been compiled in connection with the customer's acquisition or use of a particular payment card. The selection of amenity choices may, instead of being made based upon historical data or CUSTOMER flag information, be made based upon a standard selection offered by the system 1. The standard selection, while not necessarily unique to a particular customer, may nonetheless be dynamic. For instance, the standard selection of amenity choices may vary based on time or date according to which amenity providers have purchased advertising on the system 1. Furthermore, the standard selection may vary according to time and/or date such that according to the time/date, certain amenity choices would be most appealing to the customer.

In step 502 an ADVERTISE AMENITIES subroutine is called to promote the selection of amenity choices. The ADVERTISE AMENITIES subroutine presents a brief audiovisual commercial of the different amenities available for purchase. This subroutine is optional and may not be presented at all, or it may be intermittently presented with a display of a list of the amenity choices as described in the execution of step 504. In step 504, the choices of amenities available for purchase are displayed to the customer on the display 20*a*. The choices may be by category, e.g., "food items," "clothing," "movie tickets," or the like, with specific options branching from each category, e.g., under "food items," the options might be "McDonald's" or "Subway." In other instances, the category choice might have only one selection available.

In step 506, a determination is made whether the customer has selected one of the amenity choices. If so, execution proceeds to step 508 wherein a subroutine is called that presents the selected choice to the customer. This subroutine may simply present a menu of options, e.g., "drink," "fries," "burger," or alternatively there may first be a commercial relating to the amenity choice before menu selections are available. The menu choice selections likewise may be presented in a combined screen format with full motion graphics and advertising being presented along with the particular graphics for making the touch-screen choice. For example, one might see on one part of screen 20*a* a burger being cooked and hear the sizzling sound, while being able to select it by touching the screen from a menu of various choices.

In step 510, the customer's purchase selections are captured. As the customer makes selections using the touch-screen 20*b*, the display 20*a* includes a portion of the display, i.e., a window, that maintains a running total of the cumulative amenity purchases. This running total comprises a "video receipt" that allows thus the customer to see, in real time, the amount accumulating for payment once the selection is confirmed. As will be appreciated by those skilled in the art, the touch-screen interface of the display 20 enables the particular subroutine for the amenity to be designed in a manner whereby the customer can delete undesired selections and confirm purchase choices before actual payment is made. Also, it is recognized that when the customer is purchasing items from multiple amenity choices, the video receipt being displayed can optionally indicate the purchase total for the entire transaction of all amenity choices.

In step 512, after the customer has completed the purchase selections for the chosen amenity, the customer is prompted to select between ending the further display of amenity choices or alternatively going back to the original menu of choices. If the customer ends further display, execution returns to the main program 300 for further processing, as described in detail below. If the customer selects to further view the display of amenity choices, execution returns to step 504.

If in step 506 a selection is not made of a displayed amenity choice within a predetermined time period, execution proceeds to step 514. In step 514 a selection is made by the system 1 of a commercial to be displayed to the customer, based upon data compiled for that customer. If no such data exists, the selection of the commercial to display is made based upon a predetermined standard selection. As with the standard selection of amenities, discussed above, the standard selection is not necessarily static and may depend upon paid advertising or upon time/date preferences. If data about the customer exists in the database 32, this data is used to select an appropriate commercial for the customer. As stated previously, the customer data may include CUSTOMER flag information, previous purchase history or demographics and the selection of the commercial is derived therefrom.

In step 516 the commercial is run using the interactive graphics display 20. The commercial can be one or more of a wide variety of sound and visual images including a logo, a trademark, a series of still pictures, sound bites, and full motion video. The commercial may or may not include prompts for allowing immediate selection and purchase. In step 518, if the commercial enables selection by the customer and the customer makes the selection, execution returns to step 508 wherein the amenity for the commercial is offered for purchase. If in step 518 the commercial is not selected (or is not selectable), execution proceeds to step 520. In step 520, a determination is made whether fuel is still being dispensed to the customer. If so, execution returns to step 514 for the selection of another commercial to display to the customer. If in step 520 a determination is made that fueling is complete, execution returns to the program 300 (FIG. 3) and the OFFER ADVERTISING subroutine in step 306 is completed.

Figure 6:
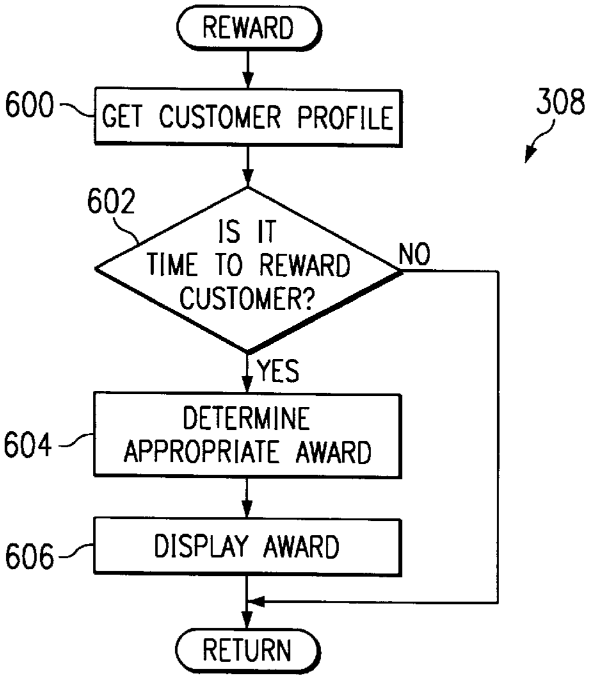
FIG. 6 is an operational flow chart of a REWARD subroutine of the main program of FIG. 3.

Referring to FIG. 6, execution of the OFFER REWARD subroutine of step 308 begins with step 600, which calls a GET CUSTOMER PROFILE subroutine. The GET CUSTOMER PROFILE subroutine retrieves the record of customer data from the database 32 (FIG. 2) corresponding to the present customer. The customer data includes such things as frequency of fuel purchases, company fleet information or the customer's birthday, for example. Execution then proceeds to step 602, where a determination is made of whether to give the customer some type of reward. The award determination may be based upon the customer data or alternatively may be based on the status of a particular promotion being offered at the store. If a determination is made that it is not time to reward the customer, execution returns to the main program 300 (FIG. 3).

If a determination is made that it is time to reward the customer, execution proceeds to step 604 which calls a DETERMINE APPROPRIATE REWARD subroutine. The DETERMINE APPROPRIATE REWARD subroutine considers many factors including the existence of a promotion and the rules therefor, the time/day, and/or previous customer purchases to determine the reward, if any, to be given to the customer. For example, if it is in the morning, the reward may be a free cup of coffee if the customer has come by at least three times in the last two weeks. At step 606, the reward may then be displayed on the display 20*a* (FIG. 2) and the customer prompted to see if the customer wants the reward. For example, the display 20*a* might show a picture of a cup of coffee and instruct the customer to come into the store for his free cup of coffee. Execution then returns to the main program 300. If historically the customer declines the reward, in the future it may not be offered or something different could be offered in its place.

Figure 7:
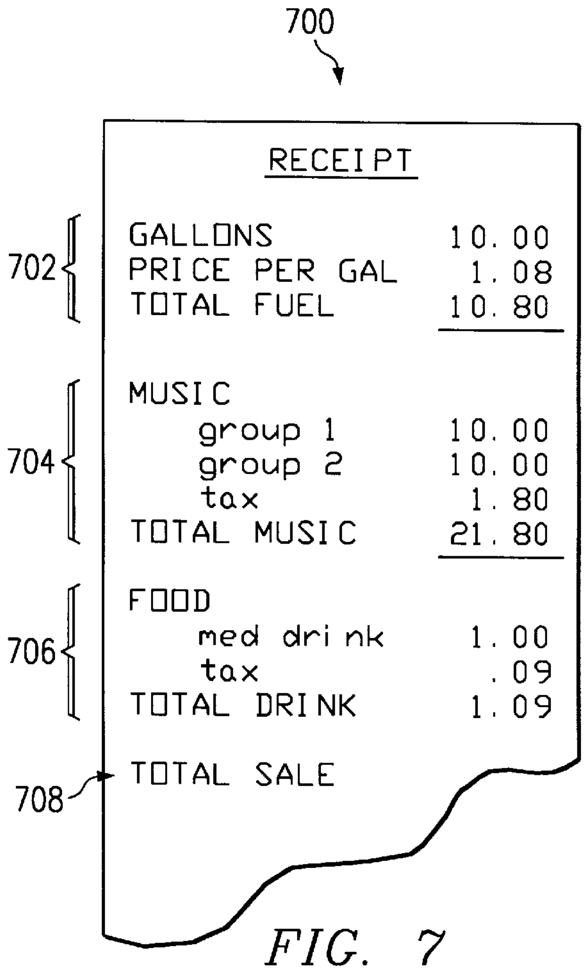
FIG. 7 is a receipt produced by the main program of FIG. 3 and the hardware of FIG. 2.

Referring to FIG. 7, the COMPLETE PAYMENT subroutine prints out a paper version 700 of the customer's receipt on the card printer 17*a* (FIG. 2) if the customer previously selected outside payment, or if inside payment was selected, notifies a clerk that payment is due, who in turn can print the receipt inside the store.

The receipt 700 is categorized by the purchases made by the customer. For example, if the customer purchased ten gallons of fuel, two music cassettes, and a medium drink, the receipt 700 separates the purchases into three categories 702, 704, 706, respectively. At the bottom of the receipt 700 is a total 708 of all the categories 702, 704, 706.

Although illustrative embodiments of the present invention have been shown and described, a latitude of modification, change and substitution is intended in the foregoing disclosure, and in certain instances, some features of the invention will be employed without a corresponding use of other features. For example, instead of a touch screen being used with the graphics board, input keys can be placed next to the graphics board 20 to allow the customer to input data. Also, the reference to commercials and instructions is merely representative of many different types of multimedia interfaces, and additional interfaces as well as additional circuits and features may be added to the illustrative embodiment without altering the scope of the invention. Accordingly, it is appropriate that the appended claims be construed broadly and in a manner consistent with the scope of the invention.

What is claimed is:

1. A fuel dispenser system with interactive graphics capabilities, the system comprising a fuel dispenser, a payment terminal connected to the dispenser, a point-of-sale controller connected to a pump controller of the dispenser and to the payment terminal via a customer activated terminal ("CAT") board for allowing a customer to dispense fuel and to pay for fuel and amenity purchases at the dispenser, an external multimedia controller connected to a graphics display via the CAT board for generating graphical payment and amenity purchase prompts to the customer, and a touch-screen interface connected to the CAT board customer-activated circuitry, the interface including a screen overlaying the display such that the customer responds to the purchase prompts by touching the screen at a location corresponding to the purchase prompts on the display, the system further comprising a database connected to said multimedia controller for storing data corresponding to the amenity purchase prompts to be generated on said display, wherein said multimedia controller determines which of said amenity purchase prompts are to be generated on said display based upon the customer responses to the prompts.

2. The system of claim 1 wherein the customer activated terminal comprises a keypad interface and wherein the multimedia controller communicates with the conventional fuel dispenser through the keypad interface.

3. A customer interface system for communication with a conventional fuel dispenser system comprising a fuel dispenser, a point-of-sale controller connected to a customer activated terminal and to a pump controller for controlling conventional operations of the fuel dispenser, the interface system comprising:

a video display terminal;

a user input device; and an external multimedia controller for sending graphical data to the video display terminal and receiving a customer input from the user input device;

wherein the multimedia controller communicates with the fuel dispenser and the point-of-sale controller through the customer activated terminal.

4. The system of claim 3 further comprising a database for recording information about a customer using the system.

5. The system of claim 3 further comprising a database for storing a series of graphical data, thereby enabling the multimedia controller to initiate one of the series of graphical data in response to a customer using the system.

6. The system of claim 3 further comprising a database for storing a series of graphical data in response to a customer using the system and for recording information about the customer.

7. The system of claim 6 wherein the data base is located at a remote location.

8. A customer interface method for use with a fuel dispenser comprising a pump controller, a card reader, a customer activated terminal, a point-of-sale controller for interfacing with said pump controller and said card reader, a graphical display, and a touch screen, the interface method comprising:

receiving payment card data into the card reader;

providing the payment card data to an externally located multimedia controller through the customer activated terminal;

receiving fuel dispensing data from the pump controller;

providing the fuel dispensing date to the external controller through the customer activated terminal;

said multimedia controller sending graphical data to the video display;

said multimedia controller receiving a customer input from the touch screen; and communicating the customer input to the credit card device through the customer activated terminal.

9. The method of claim 8 further comprising retrieving the graphical data from a database in response to the customer input.

10. The method of claim 8 further comprising storing a record of customer data into a database.

11. The method of claim 8 further comprising providing for a communication between the touch screen and the pump controller through the customer activated terminal.

12. The method of claim 11 wherein the communication includes fuel grade data.

* * * * *